United States Patent
Yamaguchi

(10) Patent No.: US 10,881,966 B2
(45) Date of Patent: *Jan. 5, 2021

(54) NETWORKED GAME SYSTEM

(71) Applicant: KABUSHIKI KAISHA SQUARE ENIX, Tokyo (JP)

(72) Inventor: Syuhei Yamaguchi, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/613,670

(22) Filed: Jun. 5, 2017

(65) Prior Publication Data

US 2017/0266563 A1 Sep. 21, 2017

Related U.S. Application Data

(63) Continuation of application No. 13/627,304, filed on Sep. 26, 2012, now Pat. No. 9,700,801.

(30) Foreign Application Priority Data

Sep. 30, 2011 (JP) .................... 2011-218579

(51) Int. Cl.
*A63F 13/79* (2014.01)
*A63F 13/216* (2014.01)
(Continued)

(52) U.S. Cl.
CPC ............ *A63F 13/79* (2014.09); *A63F 13/216* (2014.09); *A63F 13/35* (2014.09); *A63F 13/69* (2014.09);
(Continued)

(58) Field of Classification Search
CPC .......... A63F 13/00; A63F 13/12; A63F 13/35; A63F 13/352; A63F 13/79
(Continued)

(56) References Cited

U.S. PATENT DOCUMENTS 6,733,382 B2 5/2004 Oe et al.
2001/0031653 A1 10/2001 Oe et al.
(Continued)

FOREIGN PATENT DOCUMENTS

EP 1493474 1/2005
JP 2001-293256 10/2001
(Continued)

OTHER PUBLICATIONS

U.S. Appl. No. 13/537,336 to Kazuhiro Ooya, filed Jun. 29, 2012.
(Continued)

*Primary Examiner* — Chase E Leichliter
(74) *Attorney, Agent, or Firm* — Greenblum & Bernstein, P.L.C.

(57) ABSTRACT

A network game system of high interest in which a contingency and/or unpredictability intervenes in a data exchange between players in a network game is provided. When a map item and a character are selected, a game apparatus transmits a data exchange request and character information to a server apparatus. The received character information is stored in a character management table of the server apparatus. When a predetermined time elapses after the data exchange request, other-character information is specified, and the character management table is updated. The other-character information is transmitted to the game apparatus, and the game apparatus updates each table based on the received information.

4 Claims, 8 Drawing Sheets

(51) Int. Cl.
*A63F 13/35* (2014.01)
*A63F 13/69* (2014.01)
*A63F 13/92* (2014.01)
*A63F 13/352* (2014.01)

(52) U.S. Cl.
CPC ............ *A63F 13/92* (2014.09); *A63F 13/352* (2014.09); *A63F 2300/407* (2013.01); *A63F 2300/50* (2013.01); *A63F 2300/5533* (2013.01); *A63F 2300/5553* (2013.01); *A63F 2300/5573* (2013.01); *A63F 2300/8029* (2013.01); *A63F 2300/8058* (2013.01)

(58) Field of Classification Search
USPC .................................................. 463/1, 39–43
See application file for complete search history.

(56) References Cited

U.S. PATENT DOCUMENTS

| | | |
|---|---|---|
| 2002/0160838 A1 | 10/2002 | Kim |
| 2003/0008713 A1 | 1/2003 | Ushiro et al. |
| 2004/0143852 A1* | 7/2004 | Meyers .................... A63F 13/12 725/133 |
| 2004/0259642 A1* | 12/2004 | Tanaka .................... A63F 13/12 463/42 |
| 2006/0046810 A1 | 3/2006 | Tabata |
| 2007/0054716 A1* | 3/2007 | Hiruta .................... A63F 13/12 463/1 |
| 2007/0111795 A1* | 5/2007 | Choi ....................... A63F 13/12 463/42 |
| 2007/0191103 A1 | 8/2007 | Van Luchene |
| 2007/0191104 A1 | 8/2007 | Van Luchene |
| 2007/0232400 A1* | 10/2007 | Takahashi ............... A63F 13/12 463/42 |
| 2008/0139310 A1 | 6/2008 | Kando et al. |
| 2008/0146333 A1 | 6/2008 | Kando et al. |
| 2009/0227368 A1 | 9/2009 | Wyatt |
| 2009/0307226 A1* | 12/2009 | Koster .................... A63F 13/12 |
| 2010/0029382 A1* | 2/2010 | Cao ......................... A63F 13/47 463/31 |
| 2010/0160038 A1 | 6/2010 | Youm et al. |
| 2010/0227688 A1 | 9/2010 | Lee et al. |
| 2010/0229106 A1* | 9/2010 | Lee ......................... A63F 13/12 715/757 |
| 2010/0298048 A1 | 11/2010 | Yamazaki |
| 2011/0053686 A1 | 3/2011 | Takahashi et al. |
| 2011/0105221 A1* | 5/2011 | Sotoike .................... A63F 13/35 463/29 |
| 2011/0151954 A1* | 6/2011 | Bae ........................ A63F 13/355 463/1 |
| 2012/0218178 A1 | 8/2012 | Miyaji et al. |
| 2012/0225717 A1 | 9/2012 | Kuroda et al. |

FOREIGN PATENT DOCUMENTS

| | | |
|---|---|---|
| JP | 2002-052253 | 2/2002 |
| JP | 2002-306837 | 10/2002 |
| JP | 2004-208942 | 7/2004 |
| JP | 2005-319135 | 11/2005 |
| JP | 2007-306984 | 11/2007 |
| JP | 2010-094525 | 4/2010 |
| JP | 2013-059564 | 4/2013 |

OTHER PUBLICATIONS

Japanese Office Action from Japan Patent Office (JPO) in Japanese Patent Application No. 2011-218579, dated Jul. 30, 2013, together with an English language translation thereof.
Japanese Office Action for JP 2014-133415 (and partial English language translation), dated Nov. 4, 2015.
Se-Mook, "Dragon Quest IX Michikusa Adventure Guide", pp. 232-239 (and partial English language translation), published Mar. 4, 2010.
"Dragon Quest IX", sansai-Mook, vol. 279, "Game Yarikomi Max", p. 73 (and partial English language translation) published Nov. 16, 2009.
Extended European Search Report (EESR) from European Patent Office (EPO) in European Patent Application No. 12186336.9, dated Jun. 17, 2015.
Office Action from Japan Patent Office (JPO) in Japanese Patent Appl. No. 2014-133415, dated Jun. 7, 2016, together with a partial English language translation.
"Phantasy Star Portable 2 Infinity" Friend Search, [online], Dec. 8, 2010, available at http://www.famitsu.com/news/201012/08036561.html, together with a partial English language translation.
Koichi Hamamura, "Dissidia Final Fantasy", Enterbrain Mook Re, Enterbrain, Co., Ltd., 1$^{st}$ Edition, p. 35, Dec. 27, 2008, together with a partial English language translation.
Office Action from Japan Patent Office (JPO) in Japanese Patent Appl. No. 2016-175085, dated Dec. 18, 2018, together with a partial English language translation.

* cited by examiner

NETWORKED GAME SYSTEM

CROSS-REFERENCE TO RELATED APPLICATION

The present application is a continuation application of U.S. patent application Ser. No. 13/627,304, filed Sep. 26, 2012, which claims the benefit of Japanese Patent Application No. 2011-218579, filed on Sep. 30, 2011. The entire disclosure of each of the above-identified applications, including the specification, drawings, and claims, is incorporated herein by reference in its entirety.

BACKGROUND OF THE INVENTION

1. Field of the Invention

The present invention relates to a networked game system that includes a plurality of game apparatuses and a server apparatus, executes a networked game in which a game progresses according to a player's operation, and allows data to be exchanged between game apparatuses.

2. Description of the Related Art

With the spread of portable game apparatuses having a communication connection function, in order to improve amusement of a game, an exchange of data related to a character appearing in a game or data related to an acquired item is being performed between game apparatuses. For example, when users who carry a game apparatus set to a communication mode in a bag pass each other on the street, although a game apparatus is not specially operated, data related to a character or an item can be automatically exchanged by making two game apparatuses come into contact with each other within a wireless communication allowance distance.

As a game program using such a communication function, for example, a game program that controls movement of a player character in a virtual space, acquires map information representing a specific region in a virtual space through data communication, and performs control such that a player character can move to a region corresponding to the map information has been discussed (see JPA 2010-94525).

Meanwhile, in recent years, networked games in which a plurality of users simultaneously play a single game via a computer network have been widely spread. For example, in a massively multiplayer online role-playing game (MMORPG), a game progresses such that many players clear various problems while cooperating with one another in the same virtual world. Even in the MMORPG, an item or the like acquired during a game is exchanged between players. However, typically, it is usual to recognize a counterpart player by a chat or the like and then exchange an item or the like.

In the networked game such as the MMORPG, data such as an item is exchangeable between players. However, typically, players are already in a relationship of a friend or an acquaintance, and thus an exchange of data is performed after a counterpart is recognized. Therefore, an exchange of data with a player that accidently passes in a virtual world is not performed, and neither contingency nor unpredictability intervenes in a data exchange between players or characters.

The present invention is directed to provide a networked game system of high interest in which a contingency and/or unpredictability intervenes in a data exchange between players in a networked game, and thus players feel as if data is exchanged by accidently passing in a virtual world.

SUMMARY OF THE INVENTION

The present invention relates to a networked game system, comprising: a plurality of game apparatuses each of which has an input device; and a server apparatus connected with the game apparatuses via a communication network, wherein a game progresses according to a player's operation input through the input device, at least one character is assigned to each game apparatus, the game apparatus includes a data exchange request transmitter that transmits a data exchange request to execute a data exchange with another game apparatus operated by another player to the server apparatus, a character information storage that stores character information related to a character assigned to each game apparatus, and a character information transmitter that transmits the character information stored in the character information storage to the server apparatus, the server apparatus includes a data exchange request receiver that receives the data exchange request from the game apparatus, a character information receiver that receives the character information from the game apparatus, a received character information storage that stores the character information received by the character information receiver, an other-character information specifier that specifies other-character information related to at least one another character assigned to another game apparatus among a plurality of pieces of character information stored in the received character information storage, and an other-character information transmitter that transmits the other-character information specified by the other-character information specifier to the game apparatus, and the game apparatus further includes an other-character information receiver that receives the other-character information from the server apparatus, and an other-character information storage that stores the other-character information received by the other-character information receiver.

Here, when the player operates the game apparatus to make the data exchange request, the character information related to the character assigned to the game apparatus is transmitted to the server apparatus together with the data exchange request, and the server apparatus accumulates the character information received from each of a plurality of game apparatuses. Then, any one of other-character information corresponding to other game apparatuses is specified from among a plurality of pieces of character information accumulated in the server apparatus, and then transmitted to the game apparatus. As a result, a contingency and/or unpredictability intervenes in a data exchange between players, and thus an interest of a networked game can be increased.

In the present invention, it is preferable that the other-character information specifier specifies the other-character information such that other-character information to be transmitted to a first game apparatus through the other-character information transmitter is character information related to a second character assigned to a second game apparatus, and other-character information to be transmitted to the second game apparatus through the other-character information transmitter is character information related to a first character assigned to the first game apparatus.

As described above, the character information corresponding to each game apparatus is mutually exchanged between the first game apparatus and the second game apparatus. Thus, even in the networked game, the players can feel as if communication is automatically performed when passing each other on the street and so data is mutually exchanged.

The present invention relates to a server apparatus that is connected with a plurality of game apparatuses each of which includes an input device via a communication network, and executes a networked game system that allows a game to progress according to a player's operation input through the input device, wherein at least one character is assigned to each game apparatus, the server apparatus comprising: a data exchange request receiver that receives a data exchange request to execute a data exchange with another game apparatus from the game apparatus; a character information receiver that receives character information related to a character assigned to each game apparatus from the game apparatus; a received character information storage that stores the character information received by the character information receiver; an other-character information specifier that specifies other-character information related to at least one another character assigned to another game apparatus among a plurality of pieces of character information stored in the received character information storage, and an other-character information transmitter that transmits the other-character information specified by the other-character information specifier to the game apparatus.

The present invention also relates to a game apparatus that includes an input device, and is connected with a server apparatus executing a networked game system that allows a game to progress according to a player's operation input through the input device via a communication network, wherein at least one character is assigned to the game apparatus, the game apparatus comprising: a data exchange request transmitter that transmits a data exchange request to execute a data exchange with another game apparatus operated by another player to the server apparatus; a character information storage that stores character information related to a character assigned to each game apparatus; a character information transmitter that transmits the character information stored in the character information storage to the server apparatus; an other-character information receiver that receives other-character information from the server apparatus; and an other-character information storage that stores the other-character information received by the other-character information receiver.

DETAILED DESCRIPTION OF EMBODIMENTS

Figure 1:
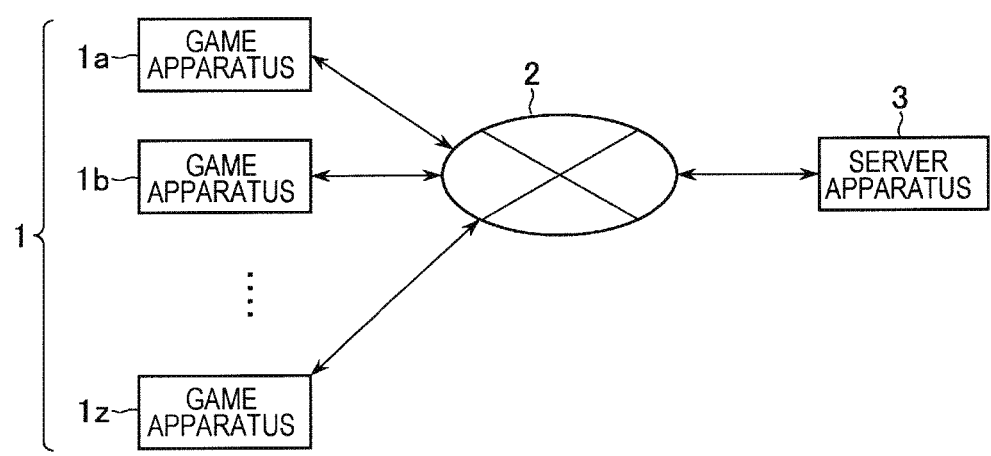
FIG. 1 is a block diagram illustrating a configuration of a networked game system according to an embodiment of the present invention.

Hereinafter, exemplary embodiments of the present invention will be described with reference to the accompanying drawings. FIG. 1 is a block diagram illustrating a configuration of a networked game system according to an embodiment of the present invention. As illustrated in FIG. 1, a networked game system includes a plurality of game apparatuses 1 (game apparatuses 1a to 1z) which are respectively operated by a plurality of players (players A to Z), a server apparatus 3, and a communication network 2. The game apparatus 1 is connected with the server apparatus 3 via the communication network 2. The game apparatus 1 need not be necessarily connected with the server apparatus 3 at all times and is preferably connected with the server apparatus 3 as necessary.

The game apparatuses 1a to 1z are connected with the server apparatus 3 to play the same MMORPG. The player can cause a player character to move on the same field map by operating a player character assigned to each game apparatus 1 and makes a game progress by cooperating or competing with one another.

For example, when the player A operates the game apparatus 1a to make a data exchange request, character information related to a character assigned to the game apparatus 1a is transmitted to the server apparatus 3 together with the data exchange request. Similarly, when the player B makes a data exchange request through the game apparatus 1b, character information of a character corresponding to the game apparatus 1b is transmitted to the server apparatus 3 together with the data exchange request. The character information received from each of the game apparatuses 1a to 1z in the above-described way is accumulated in the server apparatus 3.

Here, when a predetermined time elapses after the data exchange request of the game apparatus 1a, information (for example, character information related to a character a assigned to the game apparatus 1b) on any one of characters other than a character assigned to the game apparatus 1a is specified based on the character information accumulated in the server apparatus 3, and then transmitted to the game apparatus 1a. Similarly, when a predetermined time elapses after the player B makes the data exchange request of the game apparatus 1b, character information related to a character b assigned to the game apparatus 1a, which is accumulated in the server apparatus 3, is specified, and then transmitted to the game apparatus 1b. Since a mutual data exchange is performed between the game apparatus 1a and the game apparatus 1b as described above, even when the players play a networked game, the players can feel as if wireless communication is automatically performed when passing each other on the street and so data is mutually exchanged.

In addition, the character assigned to the game apparatus 1 may serve as not only a main character that the player operates as a main entity when a game progresses but also a sub character that recognizes a main character as a "leader"

or a "master" and follows an instruction thereof. For example, when a main character is a humanoid character, character information related to a sub character of a monster type that follows the main character can be exchanged between the game apparatus 1a and the remaining game apparatuses 1b to 1z. The sub character may be a character whose action can be operated by a player when a game progresses or may be a character who automatically acts according to artificial intelligence (AI) by designation of a broad policy even without a player's operation.

Figure 2:
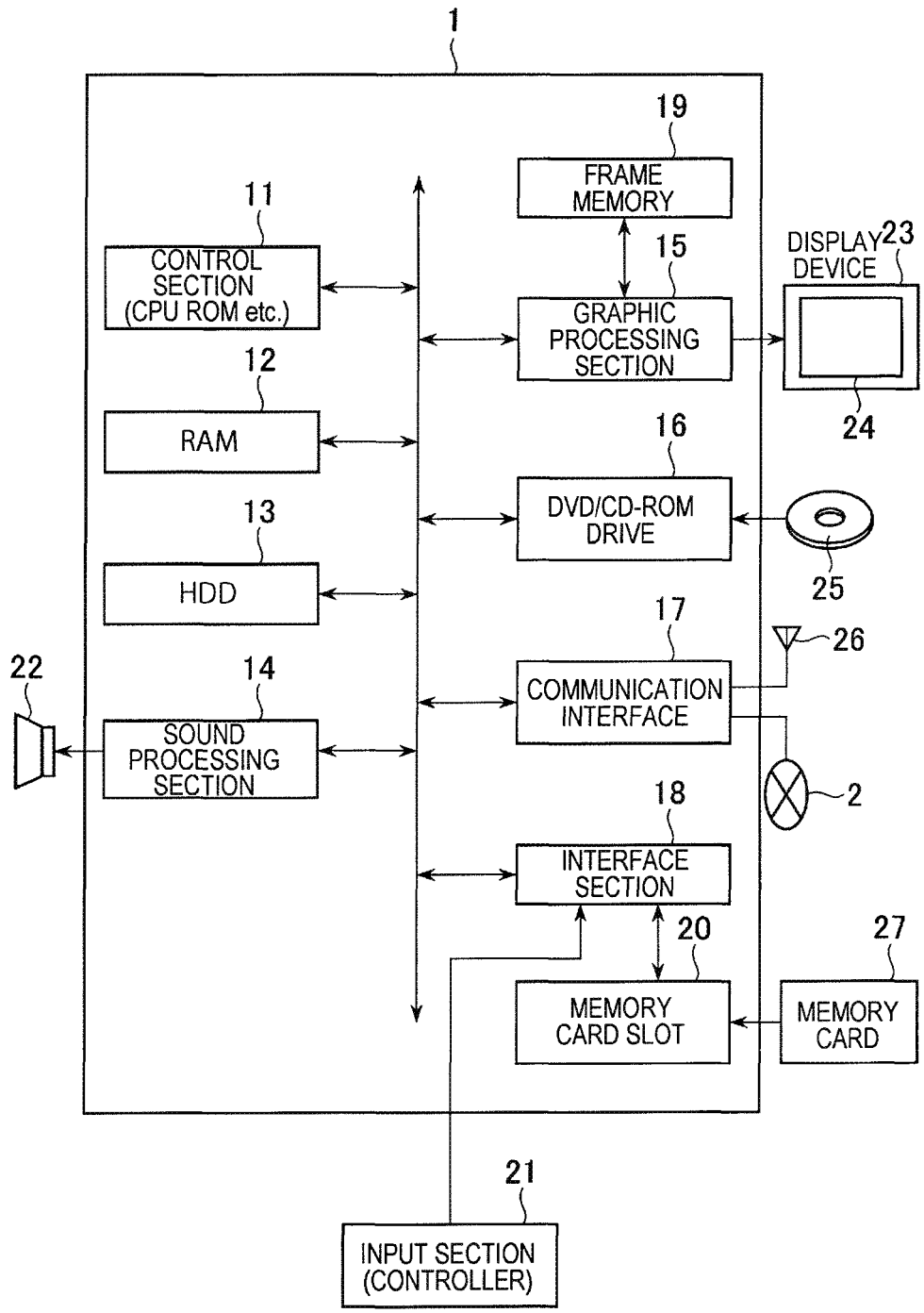
FIG. 2 is a block diagram illustrating a configuration of a game apparatus according to an embodiment of the present invention.

FIG. 2 is a block diagram illustrating a configuration of a game apparatus according to an embodiment of the present invention. The game apparatus 1 includes a control section 11, a random access memory (RAM) 12, a hard disk drive (HDD) 13, a sound processing section 14, a graphic processing section 15, a DVD/CD-ROM drive 16, a communication interface 17, and an interface section 18, which are connected with one another via an internal bus.

The control section 11 includes a central processing unit (CPU) and a read only memory (ROM). The control section 11 executes a program stored in the HDD 13 or a storage medium 25 and controls the game apparatus 1. Further, the control section 11 includes an internal timer that measures a time. The RAM 12 serves as a work area of the control section 11. The HDD 13 serves as a storage region for storing a program and data.

The storage medium 25 in which a game program is stored such as a digital versatile disk-read only memory (DVD-ROM) or a compact disk-read only memory (CD-ROM) can be placed on the DVD/CD-ROM drive 16. The storage medium 25 stores a program and data used to play a game. The DVD/CD-ROM drive 16 reads program and data necessary for the progress of a game from the storage medium 25, and loads the program and the data into the RAM 12.

The control section 11 reads a program and data necessary for the progress of a game from the RAM 12, and processes the read program and data. After processing the program and data loaded into the RAM 12, the control section 11 outputs a sound output instruction to the sound processing section 14, and outputs a rendering command to the graphic processing section 15.

The sound processing section 14 is connected with a sound output device 22 serving as a speaker. Here, when the control section 11 outputs the sound output instruction to the sound processing section 14, the sound processing section 14 outputs a sound signal to the sound output device 22.

The graphic processing section 15 is connected with a display device 23. The display device 23 includes a display screen 24. Here, when the control section 11 outputs the rendering command to the graphic processing section 15, the graphic processing section 15 develops an image onto a frame memory (a frame buffer) 19, and outputs a video signal causing an image to be displayed on the display screen 24. The graphic processing section 15 executes rendering of one image in units of frames. For example, one frame time of an image is a thirtieth (1/30) seconds.

The interface section 18 is connected with an input section (controller) 21 and a memory card slot 20. Input information input through the input section 21 by the player is stored in the RAM 12, and the control section 11 executes various kinds of calculation processes based on the input information. In addition, the interface section 18 performs a process of causing data related to a progress status of a game, which is stored in the RAM 12, to be stored in a memory card 27 or a process of reading data stored in the memory card 27 and transferring the read data to the RAM 12 according to an instruction from the control section 11.

The communication interface 17 is connected with the communication network 2 in a wireless or wired manner, and transmits/receives operation instruction information or information related to a progress status of a game to/from the server apparatus 3 as necessary. In addition, the communication interface 17 can perform wireless communication with another game apparatus 1 through a communication unit including an antenna 26.

Figure 3:
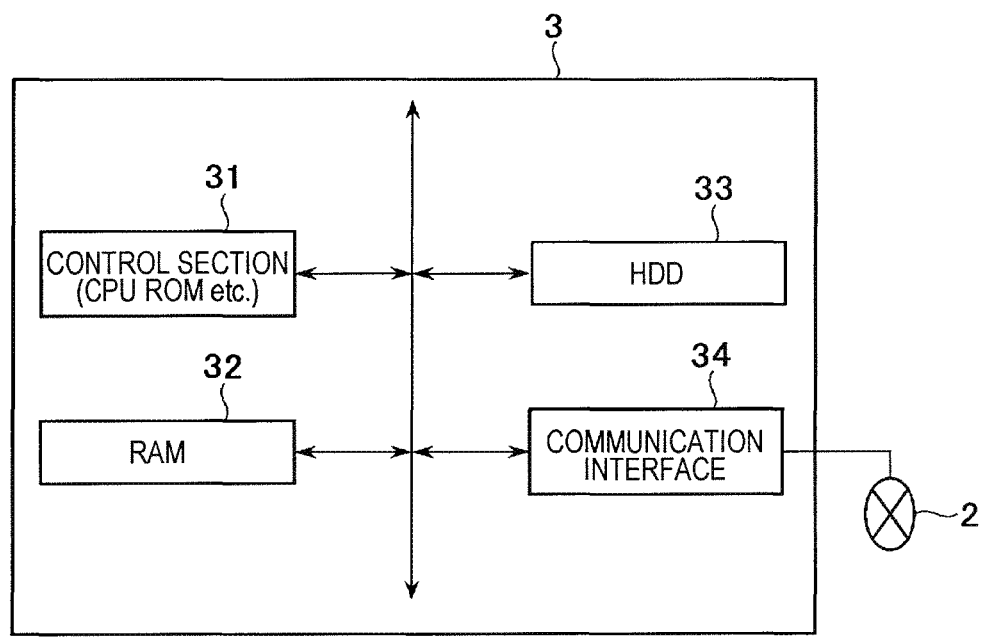
FIG. 3 is a block diagram illustrating a configuration of a server apparatus according to an embodiment of the present invention.

FIG. 3 is a block diagram illustrating a configuration of the server apparatus according to an embodiment of the present invention. The server apparatus 3 includes a control section 31, a RAM 32, a HDD 33, and a communication interface 34, which are connected with one another via an internal bus.

The control section 31 includes a CPU and a ROM, executes a program stored in the HDD 33, and controls the server apparatus 3. Further, the control section 31 includes an internal timer that measures a time. The RAM 32 serves as a work area of the control section 31. The HDD 33 serves as a storage region for storing a program and data. The control section 31 reads a program and data necessary for the progress of a game from the RAM 32, and performs a game progress process and a data exchange process based on operation instruction information received from the game apparatus 1.

Figure 4:
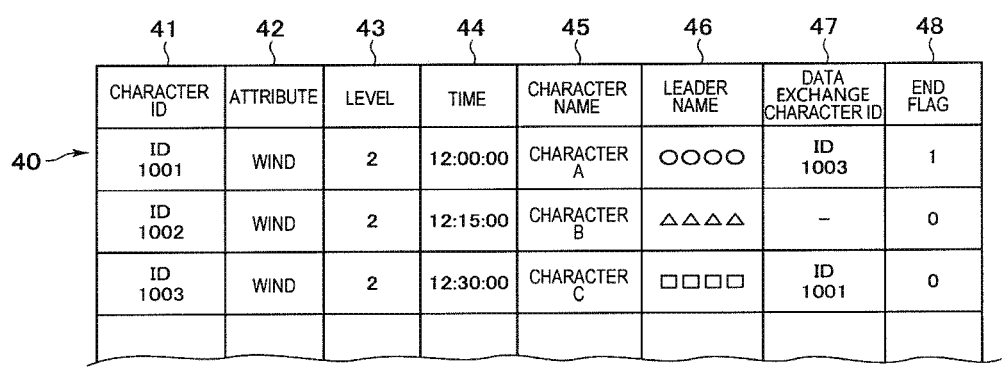
FIG. 4 is a diagram illustrating an example of a character management table according to an embodiment of the present invention.

Next, the character management table set in the RAM 32 or the HDD 33 of the server apparatus will be described. FIG. 4 is a diagram illustrating an example of the character management table according to an embodiment of the present invention. The character management table 40 stores the character information received from each game apparatus 1 together with the data exchange request.

Here, the description will proceed under the assumption that the character information related to a sub character of a monster type other than a main character that the player operates as a main entity is stored in the character management table 40 and used as a data exchange target. A sub character acts according to the AI based on a policy designated by a main character.

The character management table 40 stores a character ID 41, an attribute 42, a level 43, a time 44, a character name 45, a leader name 46 (a name of a main character followed by a sub character), a data exchange character ID 47, an end flag 48, and the like. The attribute 42, the level 43, the time 44, the character name 45, the leader name 46, the data exchange character ID 47, and the end flag 48 are stored in association with the character ID 41.

The character ID 41 is an identification number used to specify a sub character following each main character. The attribute 42 is set to a game in advance, defines the nature or a growth way of a sub character, and is expressed, for example, by "fire," "soil," "water," and "wind." The nature of a character represents a characteristic feature such as "it is difficult to suffer damage by a fire-based attack" or "it is easy to suffer damage by a water-based attack," and a sub character grows according to the attribute 42.

The level 43 is a parameter representing the strength of a sub character, and when an experience value obtained by winning a battle with an enemy character reaches a predetermined value, the level 43 of a sub character is improved. As the level 43 of the sub character is improved, the statuses of a physical strength value, a supernatural power value, an offensive power, or the like of the sub character are improved, and the sub character can fight a battle with an enemy character with an advantage.

The time 44 refers to a time at which the server apparatus 3 receives the data exchange request. The data exchange request may be transmitted to the server apparatus 3 in response to an input to the input section 21 of the game apparatus 1 or may be transmitted to the server apparatus 3 when a predetermined condition is satisfied during the process in which the player makes a game progress. Here, it is assumed that when an operation of causing a main character to use a map item and select a sub character that is to search an area represented by a map item is input to the input section 21, the data exchange request is transmitted from the game apparatus 1.

The character name 45 represents a name of a sub character serving as a target of a data exchange with another game apparatus 1 and is a name of a sub character that explores an area represented by a map item. The leader name 46 is a name of a main character which the player operates as a main entity when making a game progress, and a game progresses according to a setting that causes a sub character to follow a main character.

The data exchange character ID 47 is an identification number used to specify another character with which a character specified by the character ID 41 exchanges data. For example, let us assume that when the player B makes a data exchange request using a map item and the character b assigned to the game apparatus 1 operated by the player B is stored in the character management table 40, the player A makes a data exchange request after the player B. Here, when a predetermined time elapses after the player B makes the data exchange request, the exploration of the sub character on the area represented by the map item ends, and the character a operated by the player A is specified as a counterpart that is to exchange data with the character b operated by the player B. In this case, an ID of the character b is stored as the data exchange character ID 47 in association with the character ID 41 of the character a, and an ID of the character a is stored as the data exchange character ID 47 in association with the character ID 41 of the character b.

The end flag 48 is set to a character that has ended the exploration of an area represented by a map item when a predetermined time has elapsed after the data exchange request. As a character to which the end flag 48 is set, another character that exchanges data in step S6 which will be described below is specified, but the character is excluded from a target to be specified as another character. In other words, since the exploration of the area represented by the map item has been already ended, the character to which the end flag 48 is set does not pass the other characters in the area represented by the map item.

The character information stored in the character management table 40 is automatically deleted when a predetermined time elapses after stored in the character management table 40. Here, when a time period in which the area represented by the map item is explored is about 30 minutes to about 2 hours, the character information is automatically deleted when a predetermined time (for example, 24 hours or 48 hours) longer than the time period elapses, and thus a load of the server apparatus 3 can be reduced.

Figure 5:
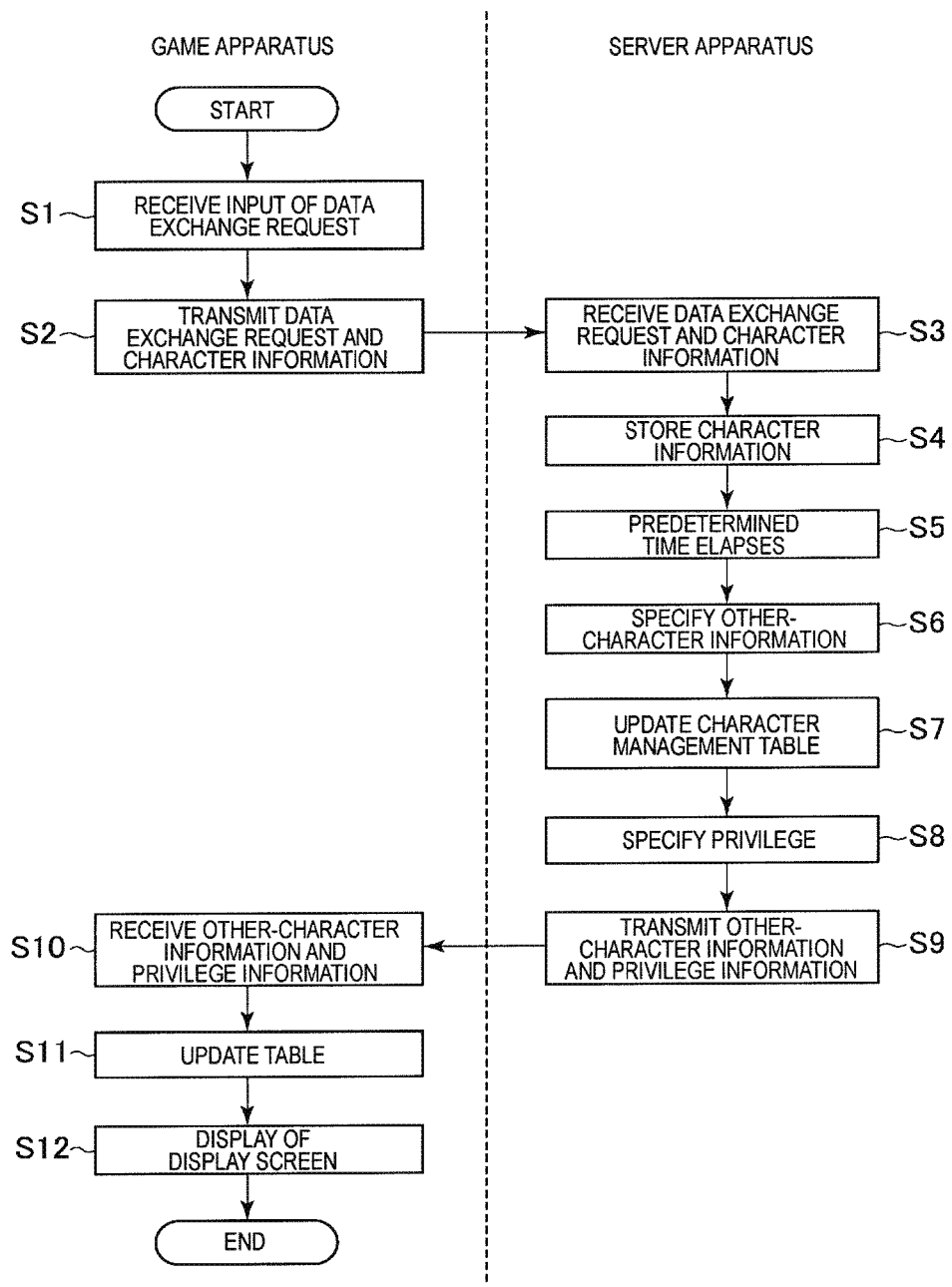
FIG. 5 is an example of a flowchart of a data exchange process according to an embodiment of the present invention.

Next, a data exchange process between the game apparatuses 1 will be described. FIG. 5 is an example of a flowchart of a data exchange process according to an embodiment of the present invention. The process of steps S1 to S12 is executed between each of a plurality of game apparatuses 1 and the server apparatus 3 connected with a plurality of game apparatuses 1 in common.

First, when an area represented by a map item and a sub character that is to explore the corresponding area are selected by the player's input operation to the input section 21, the game apparatus 1 receives an input of a data exchange request (step S1).

Then, the character information is transmitted from the game apparatus 1 to the server apparatus 3 together with the data exchange request (step S2). Here, the character information includes the character ID 41, the attribute 42, the level 43, the character name 45, and the leader name 46 of the selected sub character.

Next, the server apparatus 3 receives the data exchange request and the character information (step S3). The character information received in step S3 is stored in the character management table 40 set to the RAM 32 or the HDD 33 of the server apparatus 3 (step S4). The server apparatus 3 is connected with a plurality of game apparatuses 1 that cause a networked game to progress, and the character information is transmitted from each of a plurality of game apparatuses 1. As a result, the character information of each of a plurality of game apparatuses 1 is stored in the character management table 40. In addition, in the case in which an attribute and a level are set to a map item in advance, the character management table 40 is provided for each type of map item or for each map item having the same attribute and level.

Next, when a time is measured by the internal timer and it is determined that a predetermined time elapses from the time 44 of the character management table 40, that is, when a predetermined time elapses after reception of the data exchange request and the character information in step S3 (step S5), other-character information related to another character other than an own character is arbitrarily specified among pieces of character information stored in the character management table 40 (step S6).

However, the character to which the end flag 48 is set has already ended the exploration of the area represented by the map item and is thus excluded from another character to be specified in step S6. In this way, data is exchanged between characters that slightly overlap in a time to explore an area represented by a map item. Thus, while a character is exploring an area represented by a map item, a rendering effect by which the character accidently passes another character, and in this case, a data exchange is performed can be given.

The number of pieces of other-character information specified in step S6 may have an upper limit, and may not have any special upper limit. In addition, the exploration of an area represented by a map item may end in a situation in which another character which is to perform a data exchange is not specified and thus a data exchange is not performed.

Further, when the character management table 40 is provided for each type of map item or for each map item having the same attribute and level, specifying of other-character information in step S6 is performed such that another character stored in the same character management table 40 is specified. Therefore, when a plurality of characters explore a map item of the same type or a map item of the same attribute and level during almost the same time period, data is exchanged between the characters. Since a difficulty level at the time of exploration of an area represented by a map item differs according to a level of a map item, a data exchange is likely to be performed between characters having inevitably the same level.

The other-character information specified in step S6 is arbitrarily specified based on the character information stored in the character management table 40. However, for example, characters which are close in a time at which the data exchange request is made to each other may be specified with high probability. The characters which are close in a time at which the data exchange request is made to each other overlap during a time period longer than a time period in which an area represented by a map item is explored. Thus, when the characters which are close in a time at which the data exchange request is made to each other are configured to perform a data exchange with high probability, a possibility that the characters will meet with each other in an area represented by a map item can be increased.

In addition, in step S6, other-character information used to perform a data exchange may be specified according to status information included in the character information. The attribute 42, the level 43, or the like may be used as the status information to specify other-character information. For example, a data exchange with a character having the same attribute 42 or the same level 43 may be performed with higher probability than a data exchange with a character having a different attribute 42 or a different level 43. In this case, a data exchange with a player who is common in a progress status of a game to the some extent can be performed while leaving a contingency or unpredictability of a data exchange, and thus an interest can be further increased.

Meanwhile, when the other-character information serving as a data exchange target is specified in step S6, the character management table 40 is updated (step S7). In other words, the end flag 48 is set to a character in which a predetermined time has elapsed after reception of the data exchange request and the character information. In addition, a character ID of another character which is to perform a data exchange is stored as the data exchange character ID 47 in association with a character ID of the character in which the predetermined time has elapsed. Further, the character ID of the character in which a predetermined time has elapsed is stored as the data exchange character ID 47 in association with the character ID of another character.

Next, a privilege which can be obtained when a character explores an area represented by a map item is specified (step S8). Examples of the privilege which can be obtained by a character include an experience value necessary to improve the level 43, and a virtual currency or an item that can be used in a game. The privilege which can be obtained by a character is specified according to the attribute 42 and the level 43 of a character or according to an attribute and a level of a map item.

The server apparatus 3 is provided with a privilege table for each attribute and level of a map item. For example, an upper limit value and a lower limit value of an obtainable experience value and virtual currency, the type of an item, and the like are set in advance for each attribute and level of a character. In step S8, an experience value, a virtual currency, and an item which can be obtained by a character are arbitrarily specified according to the privilege table.

As described above, when a predetermined time elapses after the data exchange request is made, a privilege is automatically specified. Thus, although the player does not specially operate a sub character, a rendering effect by which a sub character automatically explores an area represented by a map item and obtains an experience value, a virtual currency, an item, and the like can be given. Thus, the player can concentrated on an original game progress while operating a main character.

Next, privilege information such as the character information of another character specified in step S6 and an experience value specified in step S8 are transmitted to the game apparatus 1 (step S9). The character information of another character to be transmitted to the game apparatus 1 is transmitted based on the character information stored in the character management table 40. First, an ID of another character is specified based on the data exchange character ID 47 stored in association with a character ID of a character of the game apparatus 1 serving as a reception side, and the attribute 42, the level 43, the character name 45, and the leader name 46 stored in association with the character ID 41 of another character are transmitted to the game apparatus 1 as information of another character.

The game apparatus 1 receives other-character information and the privilege information (step S10), and updates each table stored in the game apparatus 1 (step S11). In other words, a data exchange character management table used to manage the character information of another character which is obtained by a data exchange of a character other than a character assigned to the game apparatus 1 and an own character management table used to manage the character information of an own character assigned to the game apparatus 1 are updated.

Figure 6:
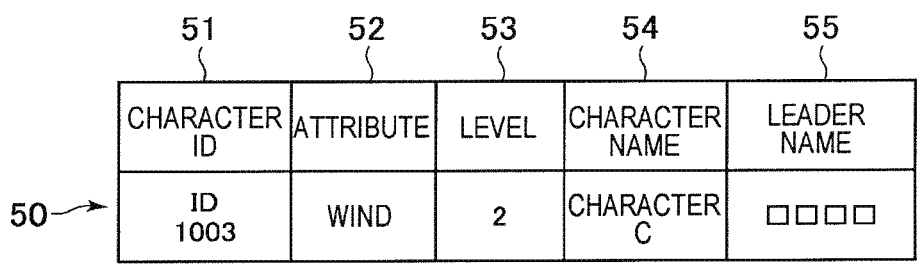
FIG. 6 is a diagram illustrating an example of a data exchange character management table according to an embodiment of the present invention.

FIG. 6 is a diagram illustrating an example of a data exchange character management table according to an embodiment of the present invention. The data exchange character management table 50 is set to the RAM 12 or the HDD 13 of the game apparatus 1. The data exchange character management table 50 stores a character ID 51, an attribute 52, a level 53, a character name 54, and a leader name 55. The data exchange character management table 50 is updated based on the information received from the server apparatus in step S10.

The character ID 51 represents an identification number specifying a character that has exchanged data, and the attribute 52 and the level 53 represent an attribute and a level of a corresponding character, respectively. The character name 54 is a name of a corresponding character, and the leader name 55 is a name of a main character that is followed by a corresponding character. As will be described below, a list of characters which have exchanged data may be displayed on the display screen 24 of the game apparatus 1, and the list is displayed based on the data exchange character management table 50.

Figure 7:
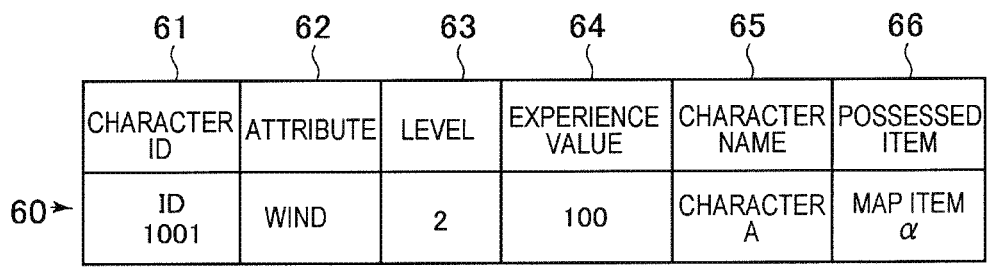
FIG. 7 is a diagram illustrating an example of an own character management table according to an embodiment of the present invention.

FIG. 7 is a diagram illustrating an example of an own character management table according to an embodiment of the present invention. The own character management table 60 is set for each sub character that is following a main character. The own character management table 60 stores a character ID 61, an attribute 62, a level 63, an experience value 64, a character name 65, and a possessed item 66. Here, when an experience value or an item is obtained by a series of processes of steps S1 to S8, the experience value 64 or the possessed item 66 of the own character management table 60 is updated in step S11. Since a plurality of sub characters can follow a single main character, a plurality of characters may be stored in the own character management table.

Figure 8A:
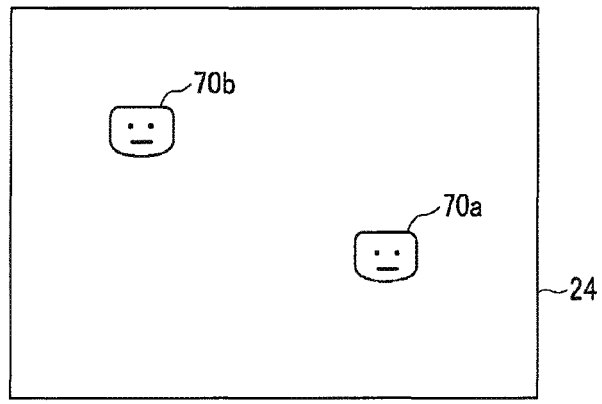
FIGS. 8A to 8C are diagrams illustrating an example of a display screen of a game apparatus according to an embodiment of the present invention.
Figure 8B:
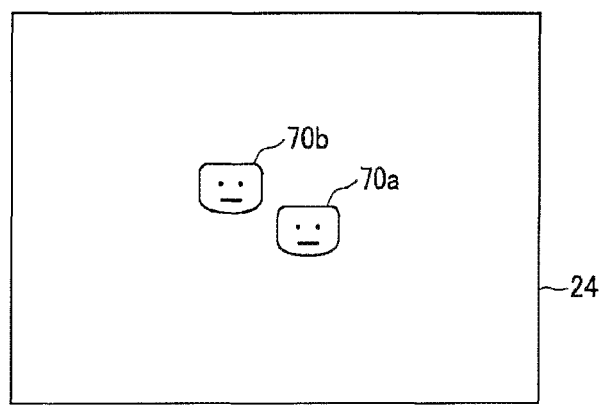
Figure 8C:
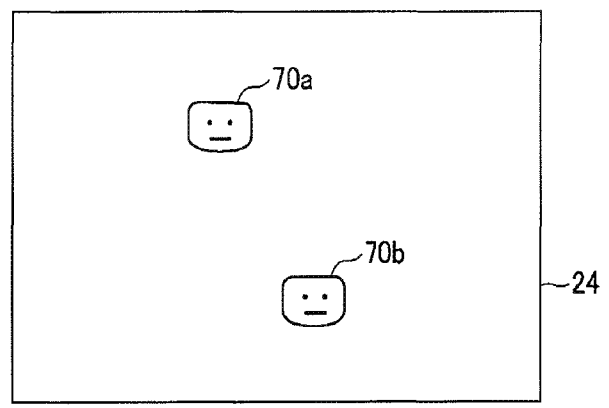

Here, when each table is updated in step S11, a form in which an own character and another character that has exchanged data pass each other is displayed on the display screen 24 of the game apparatus 1 (step S12). FIGS. 8A to 8C illustrate an example of the display screen of the game apparatus when characters encounter each other and exchange data with each other according to an embodiment of the present invention. A sub character 70a that is a sub character following a main character of the game apparatus 1 and is exploring an area represented by a map item is displayed on the display screen 24. Further, a sub character 70b of a counterpart that has exchanged data with the sub character 70a is displayed.

First, a display is performed such that the sub character 70a and the sub character 70b are positioned to be distant from each other on the display screen 24 as illustrated in FIG. 8A and then gradually approach each other, and the sub character 70a and the sub character 70b are positioned to be close to each other as illustrated in FIG. 8B. Then, a display is performed such that the sub character 70a and the sub character 70b move and are thus positioned to be distant from each other as illustrated in FIG. 8C. In this way, a form in which the sub character 70a and the sub character 70b pass each other is displayed.

Figure 9:
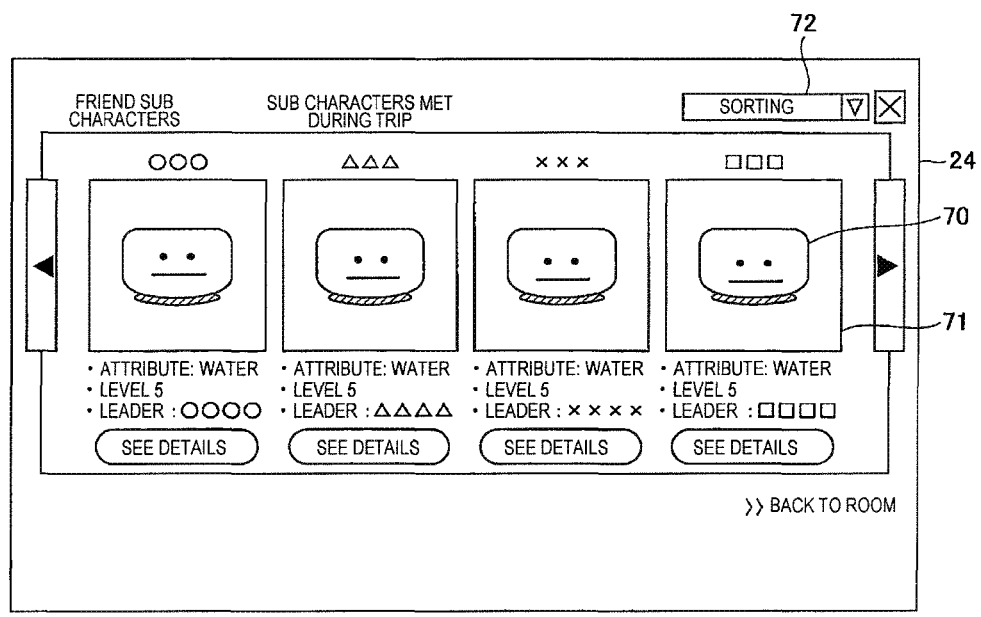
FIG. 9 is a diagram illustrating an example of a display screen of a game apparatus according to an embodiment of the present invention.

In addition, the player can check a list of character information of other characters that have exchanged data in the past through the display screen 24 during the progress of a game. FIG. 9 illustrates an example of a display screen of the game apparatus when a list of character information of other characters is displayed according to an embodiment of the present invention. The display screen 24 is provided with a sub character display region 71 used to display a sub character of a counterpart that has exchanged data and horizontally displays a list of sub characters 70. A sub character name (for example, "000") is displayed above the sub character display region 71. Further, an attribute, a level, and a leader name of each sub character 70 are display below the sub character display region 71. The information displayed on the display screen 24 is displayed with reference to the data exchange character management table 50.

The displayed sub characters 70 may be slid in a horizontal direction by operating a cross key of the input section 21, and then a desired sub character 70 may be selected. The details of status information of the selected sub character 70 as well as an attribute and a level of the sub character 70 can be browsed. Further, when a sorting button 72 is selected, the sub characters 70 can be sorted based on the attribute, the level, or the like of the sub characters 70 that have exchanged data.

In the above-described embodiment, when an instruction to explore an area represented by a map item is given to a sub character, although the player does not specially make an operation, the exploration ends after a predetermined time elapses, the sub character automatically obtains an experience value, a virtual currency, and the like, and exchanges data with another character. However, when the player operates the sub character to explore an area represented by a map item and so the sub character is moving on a field of an area represented by a map item, a data exchange with another character can be performed when a distance from another character is within a predetermined distance.

In the above-described embodiment, the character information is exchanged between characters that are exploring an area represented by a map item. However, data such as an item possessed by each character as well as data of the character information may be exchanged. For example, a map item a possessed by the character a and a map item b possessed by the character b may be exchanged. Through this configuration, many players can relatively easily obtain a special item or a valuable item, and thus an interest of a game can be increased.

In this case, when the data exchange request and the character information are transmitted in step S2, item information related to an item possessed by each character is transmitted to the server apparatus 3 together with the character information. The item information is stored in the character management table 40 of the server apparatus 3 in association with the character ID, and when other-character information is specified in step S6, an item to be exchanged is arbitrarily specified among items possessed by a character.

Then, in step S9, item information of the item specified as a data exchange target is transmitted to the game apparatus 1 of the counterpart together with the character information.

The above-described embodiment has been described in connection with the example in which the present invention is applied to the MMORPG. However, the present invention is not limited to this example, and a genre of a game is not limited as far as the present invention is applied to a networked game. Specifically, the present invention can be applied to an on-line action game, an on-line shooting game, an on-line sports game, and the like.

What is claimed is:

1. A networked game system, comprising:
    a plurality of game apparatuses each of which has an input device; and
    a server apparatus connected with the plurality of game apparatuses via a communication network,
    wherein a network game progresses according to a player operation input through the input device,
    at least one character is assigned to each game apparatus of the plurality of game apparatuses,
    the server apparatus includes:
        a server apparatus memory that stores character information related to the at least one character assigned to each game apparatus;
        a server apparatus communication interface that transmits information of an arbitrary character to a transmission destination game apparatus to which the arbitrary character is not assigned, among a plurality of pieces of character information stored in the server apparatus memory;
    the transmission destination game apparatus includes:
        a game apparatus communication interface that receives the information of the arbitrary character from the server apparatus; and
        a game apparatus memory that stores the information of the arbitrary character received by the game apparatus communication interface,
    wherein the server apparatus communication interface transmits the information of the arbitrary character according to an attribute of the at least one character assigned to the transmission destination game apparatus,
    the attribute of the at least one character is set to the network game in advance and defines a nature or growth way of the at least one character assigned to the transmission destination game apparatus,
    the information of the arbitrary character includes data which is useable in the network game, and
    the server apparatus communication interface excludes, from the information of the arbitrary character which is transmit to the transmission destination game apparatus, information of the at least one character assigned to a different game apparatus in which a predetermined time has elapsed after the different game apparatus makes a request to the server apparatus to transmit information of an arbitrary character.

2. The networked game system according to claim 1, wherein the data which is useable in the networked game relates to an item.

3. The networked game system according to claim 1, wherein the transmission destination game apparatus further includes:
    a game apparatus processor that decides a character order for display based on the information of the arbitrary character received by the game apparatus communication interface; and a game apparatus graphics processor that displays the character information on a display screen according to the character order decided by the game apparatus processor.

4. A game apparatus that includes an input device, the game apparatus being connected with a server apparatus via a communication network, the server apparatus executing a network game system that allows a network game to progress according to a player operation input through the input device, at least one character being assigned to the game apparatus, the server apparatus transmitting information of an arbitrary character to the game apparatus, the game apparatus comprising:

a communication interface that receives the information of the arbitrary character from the server apparatus, the information of the arbitrary character being transmitted according to an attribute of the at least one character assigned to the game apparatus, the arbitrary character not being assigned by the server among a plurality of pieces of character information stored by the server apparatus to the game apparatus; and a memory that stores the information of the arbitrary character received by the communication interface, wherein the attribute of the at least one character is set to the network game in advance and defines a nature or growth way of the at least one character assigned to the game apparatus, the information of the arbitrary character includes data which is useable in the network game, and information of at least one character assigned to a different game apparatus is excluded, by the server apparatus, from the information of the arbitrary character which is transmit to the game apparatus in response to a predetermined time having elapsed after the different game apparatus made a request to the server apparatus to transmit information of an arbitrary character.

* * * * *